US006172769B1

United States Patent
Rao et al.

(10) Patent No.: US 6,172,769 B1
(45) Date of Patent: Jan. 9, 2001

(54) PRINTER DEPENDENT DESCREENING METHOD

(75) Inventors: Ravishankar Rao, White Plains; Gerhard Robert Thompson, Wappingers Falls; Charles Philipe Tresser, Mamaroneck; Chai Wah Wu, Ossining, all of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/131,041

(22) Filed: Aug. 6, 1998

(51) Int. Cl.$^7$ ..................................................... H04N 1/52
(52) U.S. Cl. .............................. 358/1.9; 358/1.9; 358/298
(58) Field of Search ...................................... 358/1.9, 1.13, 358/1.15, 456, 457, 459, 504, 527, 530, 298

(56) References Cited

U.S. PATENT DOCUMENTS

| | | | |
|---|---|---|---|
| 5,394,252 | * | 2/1995 | Holladay et al. ..................... 358/459 |
| 5,479,584 | * | 12/1995 | Curry et al. ........................... 358/1.9 |
| 5,748,330 | * | 5/1998 | Wang et al. .......................... 358/456 |
| 5,764,271 | * | 6/1998 | Donohue et al. ..................... 358/1.9 |
| 6,055,065 | * | 4/2000 | Rao et al. ............................. 358/1.9 |

* cited by examiner

Primary Examiner—Scott Rogers
Assistant Examiner—Golam Behpour
(74) Attorney, Agent, or Firm—Whitham, Curtis & Whitham; Stephen C. Kaufman, Esq.

(57) ABSTRACT

A method and an apparatus to descreen a halftoned picture takes into account the actual distribution of black or colors on the print without the need for scanning printed images but, rather, using only the printing decision matrix and the printer characteristics. For the purpose of laser printing, or more generally for reproduction on any printing device with a limited number of printing levels, a color or grayscale image has to be transformed into an array of printing decisions at each pixel of the output image. Sometimes this array is the only available representation of the original image. One may desire to reconstitute a good approximation of the original grayscale image from this array, for instance to print the picture on a printer with different characteristics from the printer for which the array was originally prepared, or to display it on a high resolution monitor. The method and apparatus to solve this problem in a way which take precise account of printer characteristics is described.

5 Claims, 3 Drawing Sheets

PRINTER DEPENDENT DESCREENING METHOD

BACKGROUND OF THE INVENTION

1. Field of the Invention

The present invention relates to descreening halftoned images and to printing a halftoned picture on different printers with different characteristics.

2. Background Description

Most printers today can print in only a limited number of colors. Digital halftoning is a technique for printing a picture (or more generally displaying it on some two-dimensional medium) using small dots with a limited number of colors such that it appears to consist of many colors when viewed from a proper distance. For example, a picture of black and white dots can appear to contain grey levels when viewed from some distance. For the sake of simplicity, the rest of the discussion will be restricted to the case of grayscale images and their rendering by black and white printers to facilitate the presentation, but those skilled in the art of digital halftoning will understand that the principles apply to color images as well. When we speak of ink, it could mean any material and/or mechanism which produces the black in the image, i.e., it could be toner for a xerographic printer, ink for an inkjet printer, etc.

We will be concerned with bilevel, fixed pixel size printers (for instance laser printers). Such printers have two fundamental characteristics:

1) The print resolution, say d dpi (dots per inch), which can be interpreted as saying that the intended fundamental units of the print are arranged on a grid of squares with each square or pixel of size 1/d inches by 1/d inches, where d typically varies from about 300 to about 3000. In some cases, the pixels lie on a rectangular grid, but since the discussion adapts equally well to this case, we will assume square pixels for definiteness.

2) The dot gain which tells us how the actual printed pixel (or dot) differs from a perfect 1/d by 1/d square in shape and size (notice that in previous sentences, the word "dot" was used in a loose sense). While many printers perform differently, standard theory and much of the prior art on calibration, e.g., "MECCA-A Multiple-Error Correction Computation Algorithm for Bi-Level Image Hardcopy Reproduction", *IBM Res. Rep.*, RZ1060 (1981) by P. Stucki, "Measurement of Printer Parameters for Model-based Halftoning", *J. El. Imag.*, 2(3) (1993) 193–204, by T. N. Pappas, C. K. Dong and D. L. Neuhoff, and U.S. Pat. No. 5,649,073 to Knox, Hains and Sharma, assumes that printed dots can be reasonably described as round, say with diameter D (or as an ellipse in the case of a rectangular grid), and the dot gain is often described accordingly.

In the sequel, we make the assumption that no printed dot goes beyond a circle with diameter 2/d centered at the middle of the pixel where it is intended to be printed (a circular dot which covers an entire 1/d by 1/d square has diameter at least $\sqrt{2}/d$. This assumption is made to simplify the discussion and in particular the description of the invention. Adaptation to a more general case is tedious to describe but not difficult to implement by anyone skilled in the art of digital printing.

As taught in the invention disclosed in U.S. patent application Ser. No. 09/085,094 filed by A. R. Rao, G. R. Thompson, C. P. Tresser, and C. W. Wu on May 26, 1998, for "Microlocal Calibration of Digital Printers", both the probabilistic nature of individual dot printing and the way printing neighboring dots in various configurations affect the dot shapes can be captured by a calibration method. This method characterizes a printer by the probability distribution of what area of ink gets printed at each pixel depending on the configuration of dots to be printed in the neighborhood of that pixel (here we use the word "ink" as a generic name for what gets printed, such as ink or toner). In the sequel, whenever we speak of printer characteristic, we mean the characteristic as given by the method of calibration of digital printers, except where otherwise specified. The probabilistic nature of such printer characterization means in particular that the notation "fixed pixel size" for a printer refers to its idealized properties rather than to actual ones.

Consider now some grayscale image to be printed with a digital printer. We assume an image of size h by v, where h and v are expressed in inches to be consistent with the unit used in the dpi description. It is then convenient to interpret this image as a matrix, I, of size H=h×d by V=v×d in the following way:

- one thinks of the image as covered by little squares of size 1/d by 1/d (also called pixels).
- each pixel p, can be designated by its horizontal ordering number i (say from left to right) and it vertical ordering number j (say from top to bottom). Thus, the location of p is specified by the pair (i,j).
- to the pixel at (i,j) one assigns the value g between 0 and 1, where 0 corresponds to white, 1 corresponds to black, and more generally, g corresponds to the grey level of this particular pixel.
- the matrix I is then defined by setting I(i,j)=g.

Given a matrix such as I, a digital halftoning algorithm will associate to it an H by V halftone matrix M whose entries $M_{(i,j)}$ are either 0 or 1. Now 0 means that no dot will be printed by the digital printer at pixel (i,j), while a 1 means that a dot is to be printed.

A grayscale image can thus be considered as an array I of B-bit numbers, where typically B ranges from 4 to 12. Because M is an array of single bits of the same size as I, straightforward storage of M instead of I represents a factor B in compression. It often happens that the original grayscale image I is not available and only the halftone (or printing decision) matrix M is retained. Usually, because different printers have different characteristics, a given M will produce different images when used with two different printers. One solution to this problem is to generate an approximation to the original grayscale image I while taking into account the printer characteristics, P, and halftone this approximation taking into account the printer characteristics of a second printer. This invention discloses a method to generate this approximation.

The process of re-creating a grayscale image from a halftoned image is called descreening or inverse halftoning. In all rigor, inverse halftoning is more general since it does not presuppose that halftoning has been done with a screen (or dithering mask), but for brevity, we shall use "descreening" as an equivalent, general term. Early methods of descreening were optical, such as in U.S. Pat. No. 4,231,656 to Dickey et al. Digital methods based on matrices such as M, for instance in U.S. Pat. No. 4,630,125 to Roetling have been proposed, as well as digital methods using a scanned image, such as in European Patent Publication 301,786 to Crosfield or in U.S. Pat. No. 4,907,096 to Stanfield et al.

Because halfoning is based on the spatial integration properties of human vision, a common descreening process consists in (weighted) averaging of the grey levels in the neighborhood of each pixel (i,j) (for example, the neighborhood can be a rectangle centered at (i,j)). To have an image independent process, the averaging is done in the neighborhood of each pixel in the same way (except maybe the boundaries of the image). We shall assume a constant neighborhood and constant weights in the sequel for simplicity, but our invention adapts as well to the more general case. The size and shape of the neighborhood where averaging is performed (or NAP for short in the sequel) is quite crucial, in particular in the case when M has been obtained using a dithering mask. Original averaging methods used pre-determined fixed cell assumptions, which are clearly drawbacks, but as taught in the invention described in U.S. patent application Ser. No. 09/110,900 filed on Jul. 6, 1998, by G. R. Thompson, R. Rao and F. C. Mintzer for "Method and Apparatus for Repurposing Binary Images", the sole knowledge of M is enough to precisely recover the cell size for screened halftones. In the simplest cases, such masks have a single cell as a tiling unit of the image and each threshold level is represented once in the cell which has no further structure. Then, in the particular case of a uniform grey level, the descreened version of the halftone will be uniform (for all grey levels) if and only if the NAP is the same size as the cell. The invention disclosed in U.S. patent application Ser. No. 09/110,900 explains how to get the cell (hence the best NAP) from the sole knowledge of the matrix M if the mask is clustered, i.e., it has a tendency to group black dots. More sophisticated masks are multicell, where each cell tends to generate a dark halftone dot (made of several printed dots), in which case the good NAP should again be the cell, not the full mask. Again, the invention disclosed in U.S. patent application Ser. No. 09/110,900 explains how to get the cell (hence the best NAP) from the sole knowledge of the matrix M.

Methods not based on averaging have also been proposed, initially assuming the knowledge of the halftoning mask, such as in U.S. Pat. No. 4,630,125 to Roetling, but later without this drawback, for instance in U.S. Pat. No. 5,027,078 to Fan or in U.S. Pat. No. 5,384,684 to Seidner et al. We will present our invention in the context of averaging methods, but it applies as well to improving other methods.

PROBLEMS TO BE SOLVED

With reference to FIG. 1, assume some bilevel fixed pixel size printer P 101 has been chosen to print the image. The printer prints a halftoned version of I input at 102. This printed halftone 103 is denoted by N, which can be understood as an H by V matrix of numbers between 0 and 1. This matrix N is determined by the decision matrix M 104 and the printer characteristic of the printer P 101. The 0–1 matrix M 104 is the output of the halftone process 105 and is used to determine NAP 106 and is also sent to an averaging method 107. We assume that the matrix M 104 has been prepared carefully, such that it has taken into account the characteristics of printer P 101. However, these characteristics of printer P cannot be inferred on the sole basis of the knowledge of matrix M 104, so that the averaging method 107 fails to generate a good enough approximation of I in the descreened output 108. Going back to the simple example of a uniform grey, and a single cell mask, we saw previously that descreening the halftone using the proper NAP 106 yields a uniform grey level. Clearly, this grey level will not be the original one if only matrix M 104 is used.

SUMMARY OF THE INVENTION

It is therefore an object of the present invention to provide a method to descreen a halftoned picture which takes into account the actual distribution of black or color dots on the print without the need of scanning printed images but, rather, using only the printing decision matrix and the characteristic of the printer.

It is another object of the invention to print a halftoned picture on different printers with different characteristics, possibly with different cell size specifications, using the descreening method of the invention.

The present invention is a method and an apparatus which uses a variety of well developed methods, such as averaging, for descreening, while taking precise account of printer characteristics and, if needed, modeling these characteristics. This invention allows one to approach the faithfulness of a scanned image while using only the knowledge of the matrix M and printer P characteristics. The only previous method of descreening that takes the printer characteristics into account utilizes an optical scanner for scanning the printed page. The present invention has the advantage that the same type of precision can be obtained without the need for scanning every printed image. Instead, the present invention uses only the knowledge of M and the printer specifications of printer P as expressed by the printer characteristics. The specifications are obtained by scanning only a single calibration target printed on up to four 8×11 inch sheets of paper.

Our invention involves a two stage approach to the problem to be solved; modeling and averaging:

The modeling consists of computing, for each pair (M,P) formed by a printing decision matrix M and a printer P with some printer characteristic, an approximation $N_1$ to the matrix N.

The averaging stage consists in using almost any preferred digital descreening technique, such as a good averaging technique, to get an approximation I' of I, but now using $N_1$ instead of M to perform the descreening.

For completeness, we will indicate how a NAP can be obtained. We will also explain how and in which cases the present invention should be used to adapt M to another printer.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
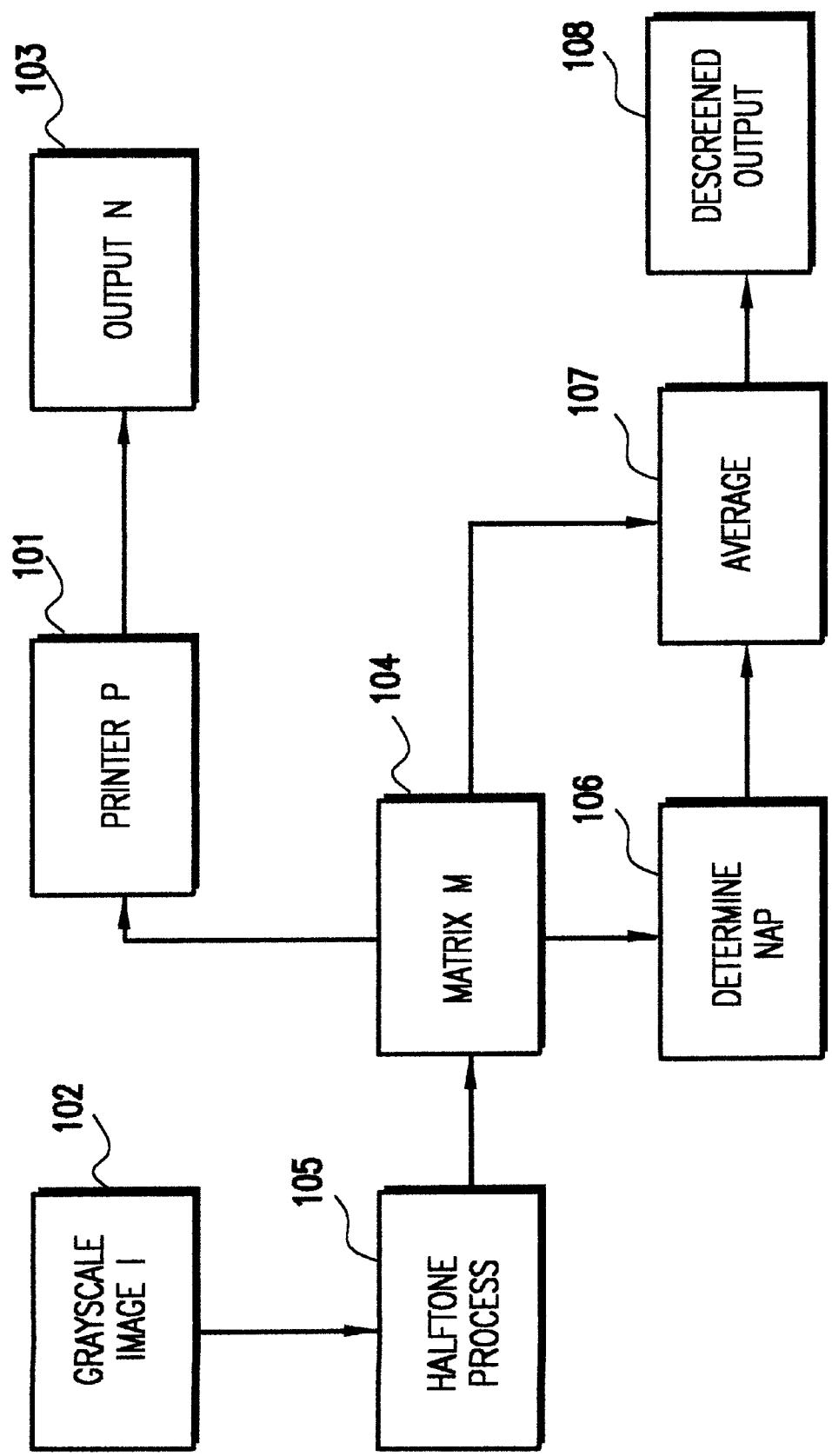
FIG. 1 is a block diagram of a prior art system in which a matrix M is used for descreening.
Figure 2:
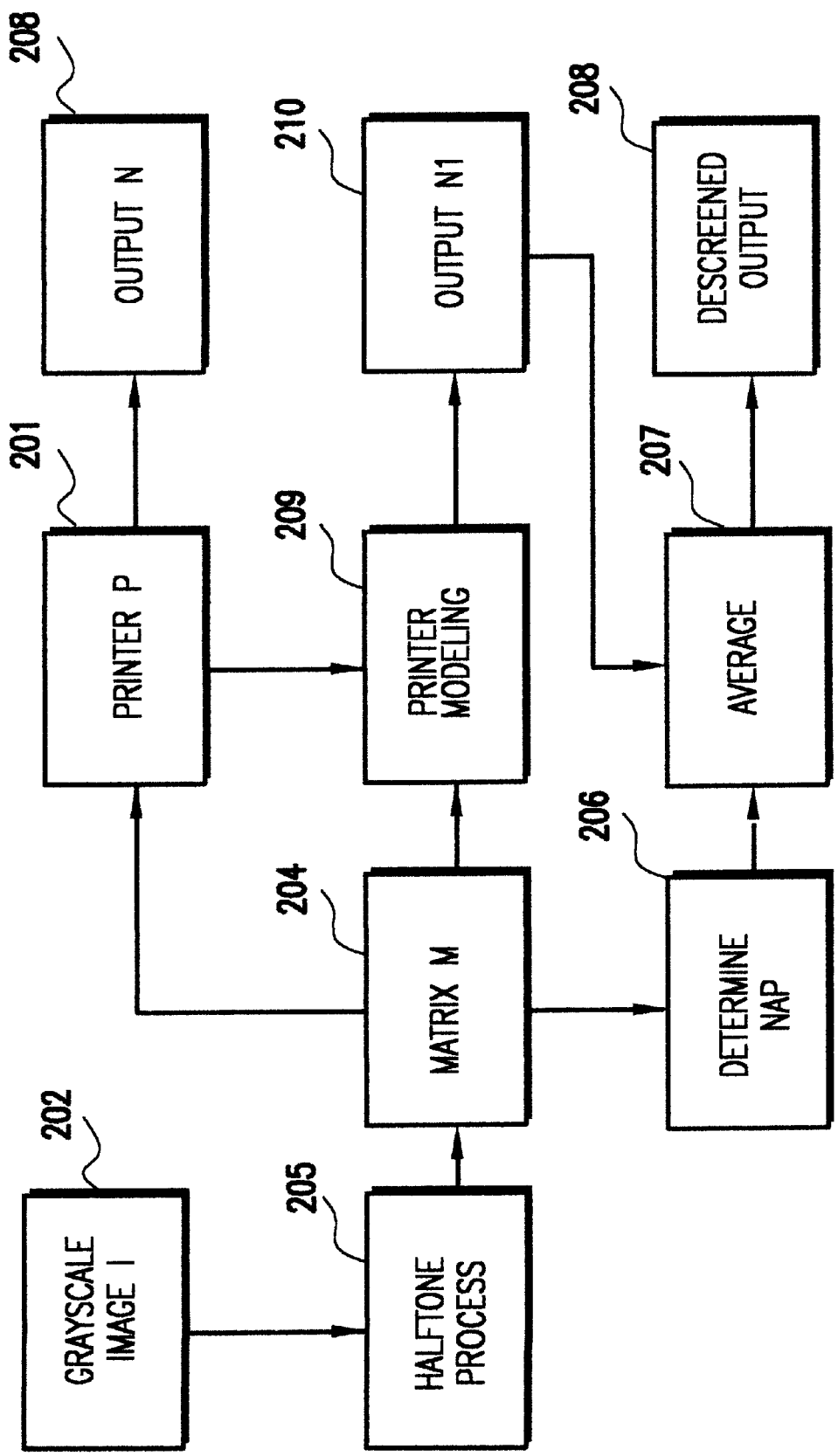
FIG. 2 is a block diagram of a preferred embodiment of the invention in which a modeled output $N_1$ is used for descreening.

Referring again to the drawings, and in particular to FIG. 2, there is shown a preferred embodiment of the invention. As in the descreening apparatus shown in FIG. 1, a grayscale image I 202 is input to a halftone process 205 which provides an output to matrix M 204. The matrix M 204 provides outputs to printer P 201 and NAP determination process 206 as before. However, in this case, the matrix M 204 provides an output to printer modeling process 209, rather than directly to the averaging method 207. Instead, the printer modeling process outputs a matrix $N_1$ 210, which is an approximation of output N 203. The matrix $N_1$ 210 is input to the averaging method 207 to generate the descreened output 208.

The amount of ink being printed at location (i,j) is probabilistically described by probability distributions depending on the local configuration of dots scheduled to be printed by the matrix M in some neighborhood $U_1$ of (i,j). This general description contains in particular the simplest case where dots are modeled by round dots with constant diameter. Thus, the printer characteristics, together with the matrix M 204, allow one to obtain the matrix $N_1$ which is an approximation to N, as we shall next explain. Let $J(M,P)_{(i,j)}$ be the H by V matrix which is zero at each entry except at (i,j) where it is equal to the proportion of the pixel (i,j) to be covered by ink according to M and the printer characteristics. Then $N_1$ can be generated as the sum of all the matrices $J(M,P)_{(i,j)}$.

The above general description includes in particular the simplest case where dots are modeled by round dots with constant diameter. Using this common model of a deterministic round dot with diameter D, one can proceed as above after using simple geometric data to reconstruct the printer characteristics. As a result, the probabilistic aspect disappears but the local configuration dependence remains. As an intermediate between a complete printer characterization and a single diameter round dot model, one can also use a variable diameter round dot model. In this case, the diameter

- either depends on the local configuration, which brings us to a formulation which incorporates a probabilistic component, or
- depends more simply on the local density, in which case one can vary the dependance by adjusting a curve (the graph of diameter versus density). Then a probabilistic aspect can be introduced (dots might not print at low density), in the form of a second graph.

Figure 3:
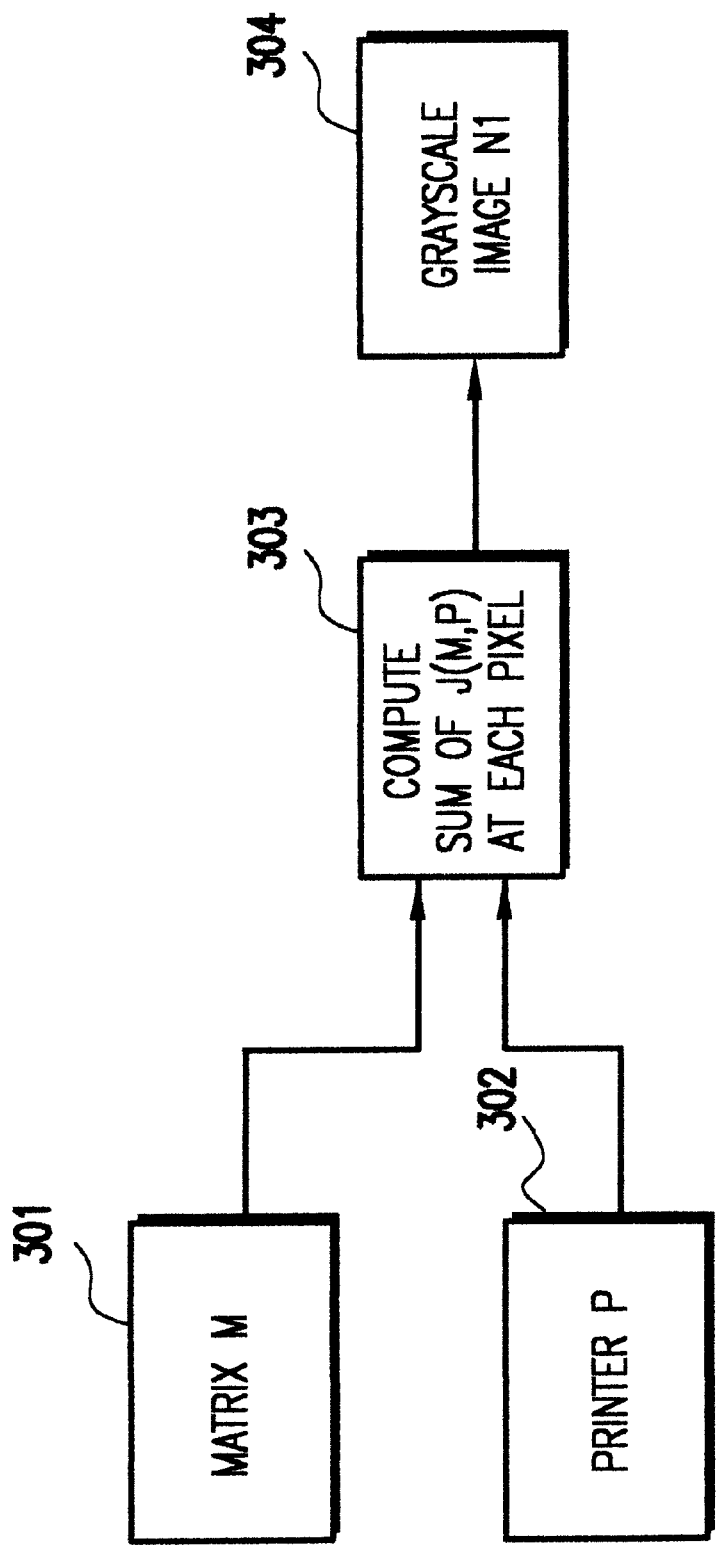
FIG. 3 is a block diagram illustrating the process of modeling.

In general, this invention can be adapted to any defined printer characterization of a printer and the modeling step can be implemented as follows, with reference to FIG. 3.

Using the halftone matrix M at 301 and the characteristics of the printer P at 302, one computes at 303 the amount $J(M,P)_{(i,j)}$ of ink to be deposited at each pixel (i,j). The array of these amounts together form the matrix $N_1$ at 304, which is an approximation of the image N printed by P when inputting the matrix M.

In the cellular case, i.e., when M has been produced by a mask with a cell or multicell structure, since the best NAP is the cell, the averaging stage is performed next by using a method to determine the cell and then choose the cell as the NAP on $N_1$. Consequently, in the cellular case the descreening process can be described as follows.

Assume one wants to visualize some printed picture on a monitor. If M is used to generate the monitor image, the result will be quite different from the print. If the monitor pixels are ideal, displaying $N_1$ instead will generate as close an approximation of the print as one can get, which can be quite useful for image proofing. Here and in the rest of this disclosure, once the number of bits, B, has been chosen, we assume that each grey level is approximated to the closest $k/2^B$ value, where k is the maximum possible gray level.

We now proceed with the averaging stage in the non-cellular case. For the rest of the discussion, until otherwise specified, we assume periodic boundary conditions on images and matrices.

We first choose an easily parameterized model for the shape of the NAP (notice that the NAP is not necessarily made of full pixels). For simplicity, we will assume an ellipse or rectangle (both determined by a length and width). The method and process are readily adaptable to more general shapes.

The weights for the average have also to be chosen. Equal weights in the NAP is often a good choice in the case when M is generated by a mask, and we will assume this choice for definiteness. In other cases, such as error diffusion, other weights are preferable, depending on the error diffusion parameters: in such cases one can use the teaching of "Inverse halftoning and kernel estimation for error diffusion" in *IEEE Trans. Image Processing*, 4 (1995) 486–498 by P. W. Wong and of "A wavelet-based approach to inverse halftoning" in SPIE Vol. 3018 (1997) 89–100 by Z. Xiong, M. T. Orchard, and K. Ramchandran.

The shape being fixed, we note that in the extreme cases when the NAP consists of either one pixel or the entire image one gets a very small number of grey levels in the descreened versions. The maximizing NAP (in the chosen shape) is then defined as the one with minimal size among those yielding the maximal number of distinct grey levels. It is clearly better to choose the NAP so that the resulting descreened image M so that the image is quite rich in grey levels. One expects the size of this NAP to be the number of grey levels of the mask if M was constructed with a mask. This size is an upper bound on the size of the NAP one wants to select. Because we use $N_1$ instead of M to compute the averages, one may expect to be able to generate many more grey levels than there are pixels in the chosen NAP. To avoid asymmetric effects, in the rectangular case, we prefer to use rectangles with sides having an odd number of pixels. Good examples are 3 by 5, 5 by 7, and 7 by 9. In case the printer P is available, the choice of the best NAP will be made easier by printing some picture, using if possible the same algorithm which generated the collection of Ms one possesses. In any case, once the NAP has been chosen, the rest of the descreening process is straightforward.

Once a descreened image has been obtained, it may be used to print a halftoned picture with another printer P'. Let M' be the corresponding printing decision matrix, N' be the halftoned picture, and $N'_1$ the corresponding matrix. M can be produced for an ink jet printer with a dispersed mask which would not get good results with P', or the picture one desires has a cell size different that the one corresponding to M. In such cases, one can use the descreened image as the original grayscale image to be processed by P', and halftone it with any algorithm one wishes: if the descreened image is obtained as described here, using $N_1$ for the averages, the resulting N' will be closer to N than if one averages using M and uses standard calibration because of the intricate way darkness depends on dot patterns.

Those versed in the art of printing will readily understand how to adapt the invention to color images and color printing. Notice that, because of the way the human eye perceives color, the pixel by pixel solution which constitutes the present invention is not necessarily preferable to spectral approaches when it comes to polychrome images, but might be preferable in some instances. Thus, while the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An apparatus for descreening an image generated by a halftone process comprising:
   a halftone printing decision matrix containing data of a halftoned image;
   a printer having defined printer characteristics;

a printer modeling process receiving data from the halftone printing decision matrix and the defined printer characteristics to generate an output matrix which is an approximation of the printer output; and an averaging process receiving the output matrix from the printer modeling process and generating a descreened output.

2. The apparatus according to claim 1 wherein the printer may be any one of a plurality of different printers having different characteristics.

3. The apparatus according to claim 1 wherein the descreened output is used to print halftone images on alternate printers with different characteristics.

4. A method to descreen a halftoned picture which takes into account the actual distribution of black or colors on a print without scanning printed images using the printing decision matrix comprising the steps of:

modeling a printer using data from a halftone printing decision matrix and defined printer characteristics to generate an output matrix which is an approximation of the printer output; and averaging the output matrix from the printer modeling process and generating a descreened output.

5. The method according to claim 4 further comprising the step of printing a halftoned picture on different printers with different characteristics using the descreening output.

* * * * *